United States Patent [19]
Solomon

[11] Patent Number: 5,588,632
[45] Date of Patent: *Dec. 31, 1996

[54] DYNAMIC SUPPORT STRUCTURE

[75] Inventor: Peter R. Solomon, West Hartford, Conn.

[73] Assignee: Advanced Fuel Research, Inc., East Hartford, Conn.

[*] Notice: The term of this patent shall not extend beyond the expiration date of Pat. No. 5,349,438.

[21] Appl. No.: 567,085

[22] Filed: Dec. 4, 1995

Related U.S. Application Data

[60] Continuation of Ser. No. 308,153, Sep. 19, 1994, abandoned, which is a division of Ser. No. 837,622, Jan. 19, 1992, Pat. No. 5,349,438, which is a continuation-in-part of Ser. No. 773,225, Oct. 19, 1991, Pat. No. 5,196,902.

[51] Int. Cl.$^6$ ........................................... G01B 9/02
[52] U.S. Cl. ................ 248/560; 248/466; 248/475.1; 248/638; 356/346; 359/871
[58] Field of Search .................................. 248/560, 564, 248/584, 638, 466, 475.1, 476, 479, 480, 486, 276.1, 282.1, 284.1; 356/346; 359/850, 871–873

[56] References Cited

U.S. PATENT DOCUMENTS

| | | | |
|---|---|---|---|
| 46,529 | 2/1865 | Metzler | 248/565 X |
| 1,137,702 | 4/1915 | Crawford. | |
| 3,330,520 | 7/1967 | Burroughs, Jr. | 248/638 X |
| 3,581,298 | 5/1971 | Billawalla | 248/560 X |
| 3,807,029 | 4/1974 | Troeger. | |
| 3,811,665 | 5/1974 | Seelig. | |
| 3,927,888 | 12/1975 | Van Der Lely | 248/585 X |
| 4,322,131 | 3/1982 | Newell | 248/479 X |
| 4,325,133 | 4/1982 | Reitmayer | 248/638 X |
| 4,497,465 | 2/2985 | Yeakley et al.. | |
| 4,891,916 | 1/1990 | Rhoades et al. | 248/638 X |
| 5,301,067 | 4/1994 | Bleier et al. | 359/871 X |

Primary Examiner—Ramon O. Ramirez
Assistant Examiner—Derek J. Berger
Attorney, Agent, or Firm—Ira S. Dorman

[57] ABSTRACT

The structure of the invention serves to support mirrors defining a reflective channel, which can dynamically be reciprocally widened and narrowed, as in a two-beam interferometer. It is effectively divided, by pivot points on an intermedial axis, into two opposite portions of equal mass, thus affording to the structure immunization against translational forces transmitted through those points. The opposite portions also have their centers of gravity remotely located, so as to generate a counteracting torque in response to moments of rotational inertia transmitted through the pivot points. In the structure, integrally formed planar pieces are assembled to provide contiguous elongate elements and an interposed connecting web element, a plurality of which web elements produce a flexure joint.

4 Claims, 6 Drawing Sheets

DYNAMIC SUPPORT STRUCTURE

This is a continuation of application Ser. No. 08/308,153 filed on Sep. 19, 1994 (now abandoned), which was a divisional of Ser. No. 07/837,622 filed on Jan. 6, 1992, and now issued as U.S. Pat. No. 5,349,438, which is in turn a continuation-in-part of application Ser. No. 07/773,225, filed on Oct. 9, 1991 and now issued as U.S. Pat. No. 5,196,902.

BACKGROUND OF THE INVENTION

Two-beam interferometer spectrometers are well known in the art. Most of the modern spectrometer designs, including the Michelson interferometer spectrometer, are described in Griffiths and DeHaseth, *Fourier Transform Infrared Spectrometer*, John Wiley & Sons, NY, Chapter 4, 121–165 (1986).

The Michelson interferometer functions by dividing an incident beam of electromagnetic radiation into two separate beams at a beamsplitter, each of which beams is caused to travel along a different optical path; one of the beams is usually directed along a reference path having a fixed optical length, while the other is simultaneously directed along a path of variable length. A retroreflecting element, such as a plane mirror, a cube corner, or a "cats eye" reflector, is placed in the optical path of each beam to return it to the beamsplitter, where the beams recombine to form a single exit beam. The optical path length variation, which is typically achieved by moving one of the retroreflectors, causes the combined exit beam to be amplitude modulated due to interference between the recombining beams. By converting the interferogram so obtained into an electrical signal, and by then analyzing that signal in a known manner, the spectrum or intensity of the input radiation can, after suitable calibration, be derived as a function of frequency.

More particularly, when such an interferometer is employed in a Fourier transform spectrometer, the exit beam is focused upon a photoconductive detector to produce the electrical interferogram signal. If a sample is so placed that the modulated beam passes through it prior to impinging upon the detector, the analysis performed can determine the absorption spectrum of the sample; other placements of the sample, and other of its characteristics, can be employed and obtained as well.

In those instances in which the optical path length through the interferometer is varied by displacement of a retroreflecting element along the optical axis of the beam, it will be appreciated that the maximum resolution attainable with the instrument is directly related to the maximum path difference that can be produced; i.e., to the maximum longitudinal displacement that is attained by moving the retroreflecting element. Because Michelson interferometers rely upon the wave interference that occurs when the two beams recombine at the beamsplitter, an important factor in determining the quality of such a device is the degree to which the optical elements remain aligned during path-length variation. Accordingly, longitudinal displacement of the moving mirror must be effected with extreme accuracy over the entire range of its travel; i.e., the moving mirror must in most cases remain aligned to within a small fraction of the wavelength of incident light, over a longitudinal displacement of several centimeters. Any irregularity in the mirror guide path, such as might cause even slight tilting of a plane mirror, will lead to significant distortion in the interferogram produced. It is of course well known that substitution of cube-corner and cats-eye retroreflectors for plane mirrors can essentially eliminate such distortion problems; but it is known as well that the use of those elements also entails certain inherent drawbacks.

Precision air bearings and the like have been employed in modern interferometers in an effort to satisfy the extreme accuracy requirements to which movable mirror guides are subject. Such systems are however quite expensive, and moreover they require a supply of pressurized gas for operation. Electronic control systems, with feedback to automatic positioners, have also been utilized as a means for dynamically maintaining mirror alignment; satisfactory self-aligning systems are however difficult to design, and they tend to be relatively large and expensive.

In view of these drawbacks, substantial effort has been devoted to the development of high-quality interferometers that do not rely upon precision bearings or electronic alignment control systems. One approach taken utilizes a tiltable reflector assembly consisting of a pair of parallel, confronting mirrors, rather than a longitudinally displaced retroreflector. As an ostensible improvement thereupon, U.S. Pat. No. 4,915,502, issued on Apr. 10, 1990, teaches a twin-arm interferometer spectrometer having a tiltable reflector assembly by which the optical path lengths of both interferometer beams are varied simultaneously, thereby achieving a desired total path difference by a much smaller rotation of the paired mirrors then would otherwise be required. Such a design affords the advantage of insensitivity to linear movement of the optical element (i.e., only angular displacements will change the path length); moreover, rotating bearings are generally easier and less expensive to produce than are longitudinal or linear ones.

Also of interest is U.S. Pat. No. 4,383,762, issued May 17, 1983, which provides a two-beam interferometer for Fourier spectroscopy in which a rigid pendulum arm is used to mount moving cube corner retroreflectors. The pendulous movement (arcuate oscillation) enables accurate optical path-length variation to be produced in a smoothly guided motion, and the cube corner retroreflectors render the optical system unaffected by the resultant tilt; this avoids the disadvantages for Fourier spectroscopy that are inherent in the deviation from strict linearity that characterizes such pendulous motion.

So-called "porch swing" mounting arrangements are also known in the art, in which structural elements, supported at four pivot points, form a parallelogram by which a mirror, mounted at right angles to one side of the parallelogram, can be translated along an axis that is perpendicular to the mirror's plane. While such designs can provide inexpensive systems in which mounted mirrors are constrained to linear motion, due to the relatively large displacement distances that were deemed necessary they have not herefore been considered practical for use in instruments in which high resolutions are to be realized.

Pervading all of the foregoing considerations is the need to effectively isolate the mirror-supporting interferometer structure from extraneous forces, which would tend to produce aberrant distortions of the structure, and to thereby introduce inaccuracies into the optical measurements made; such forces will normally arise from environmental vibrational effects, and can of course be of a rotational or translational nature. Considerations of manufacturing cost and feasibility are, needless to say, also of primary importance.

Accordingly, it is a broad object of the present invention to provide a novel structure for the dynamic support of reflective elements, in which a high degree of immunization against environmental vibration and other extraneous forces is afforded.

A more specific object is to provide such a structure in which immunization may be afforded against rotational as well as translational forces.

Other objects of the invention are to provide such structure in which a plurality of reflective elements are incorporated, and to provide, more particularly, a two-beam interferometer utilizing such structure.

Yet another object is to provide a novel structure having the foregoing features and advantages, fabricated from a plurality of unitary planar pieces, each integrally formed to provide, in assembly with the others, contiguous rigid members and interposed flexible joints.

Still further objects of the invention are to provide a novel structure, and an interferometer incorporating the same, having the foregoing features and advantages and which are, in addition, of relatively incomplex design and construction, and hence of relatively facile and inexpensive manufacture.

SUMMARY OF THE INVENTION

It has now been found that certain of the foregoing and related objects of the invention are attained by the provision of structure comprising a multiplicity of rigid members, including a pair of opposing side members and a pair of opposing end members, flexibly interconnected so as to permit conjoint displacement of the side members in opposite directions along parallel axes of shifting, with the end members rotating in the same direction about pivot points located on an intermedial axis lying between, and parallel to, the axes of shifting. The intermedial axis divides the structure into two portions, each portion including one of the side members and having its center of gravity located on a common axis that extends perpendicular to the axes of shifting. The center of gravity of at least a first one of the portions, inclusive of a first one of the side members, is spaced to the side of the intermedial axis that is opposite to the axis of shifting of the "first" side member.

The center of gravity of the other portion of the structure, inclusive of the other side member, will preferably be similarly spaced in a remote relationship to the "other" side member, across the intermedial axis. Most desirably, the centers of gravity of the two portions will be equidistantly spaced from the intermedial axis, and the portions will be of substantially equal mass. Lateral marginal portions of the side members of which the structure is comprised will generally be connected directly to the contiguous marginal portions of the end members by flexible joints, to thereby form a frame within which an open space is defined.

In more specific embodiments, the structure described will include a plurality of reflective elements so supported by the frame as to define a reflective channel within its open space. The centers of gravity of the two portions of such a structure will most advantageously be of such magnitude and disposition as to cooperatively produce, in reaction to any extraneous force that would tend to rotate the frame about its pivot points, a counteracting torque about the intersection of the above-mentioned intermedial and common axes, the value and direction of which will dynamically substantially counterbalance the extraneous force.

Even more specific forms of the structure may additionally include a first internal wall connected to the "first" side member and projecting therefrom toward the "other" side member, and a second internal wall connected to the other side member and projecting therefrom toward the "first" side member. Both of the internal walls will traverse the intermedial axis of the structure, and will have mutually confronting faces on which are mounted the reflective, channel-defining elements, disposed in laterally spaced, substantially parallel planes. The end members of the structure will normally have pivot elements disposed on its intermedial axis, so that conjoint shifting of the side members will cause reciprocal widening and narrowing of the reflective channel.

Other objects of the invention are attained by the provision of a structure comprised of a plurality of reflective channel-defining elements, as herein described, in which the two opposite structure portions are of such mass and configuration as to statically balance one another irrespective of the orientation of the intermedial axis. Further objects are attained by the provision of a two-beam interferometer comprising, in addition to the support structure described, mounting means, a beamsplitter for directing electromagnetic radiation into the reflective channel of the structure, and reflecting means for returning to the beamsplitter electromagnetic radiation that has traversed the channel.

And yet additional objects are attained by the provision of support structure having at least some of the features set forth, but comprised of an assembly of at least two similar planar pieces secured in substantially coextensive, superposed relationship and providing at least one contiguous pair of rigid members, consisting of a side member and an end member, and an interposed flexible joint. Each planar piece is of integrally formed, unitary construction, and includes first and second elongate elements, and a flexible web element joining their contiguous end portions. The web element extends on an oblique axis to the longitudinal axes of both of the elongate elements when they are mutually perpendicular; normally the oblique axis will lie at an angle of 45° to the longitudinal axes. In assembly, the "first" elements of the two planar pieces together provide the side member of the contiguous pair, the "second" elements together provide the end member, and the web elements together provide the flexible joint therebetween. By so constructing and arranging the pieces as to cause the oblique axes of the web members to cross one another, the contiguous members will be constrained to relative movement about a single axis of flexure, at the point of intersection of the oblique axes.

Each of the web elements of the planar pieces may desirably be defined by opposing concave edges of equal radius, with center points disposed on an axis perpendicular to its oblique axis. A central zone will thereby be defined at the axis of flexure, which constitutes the thinnest point along the length of the web element. Generally, each of the planar pieces will consist of four elongate elements, and four interposed web elements, thus providing a closed, frame-like piece.

DETAILED DESCRIPTION OF THE PREFERRED AND ILLUSTRATED EMBODIMENTS

Figure 1:
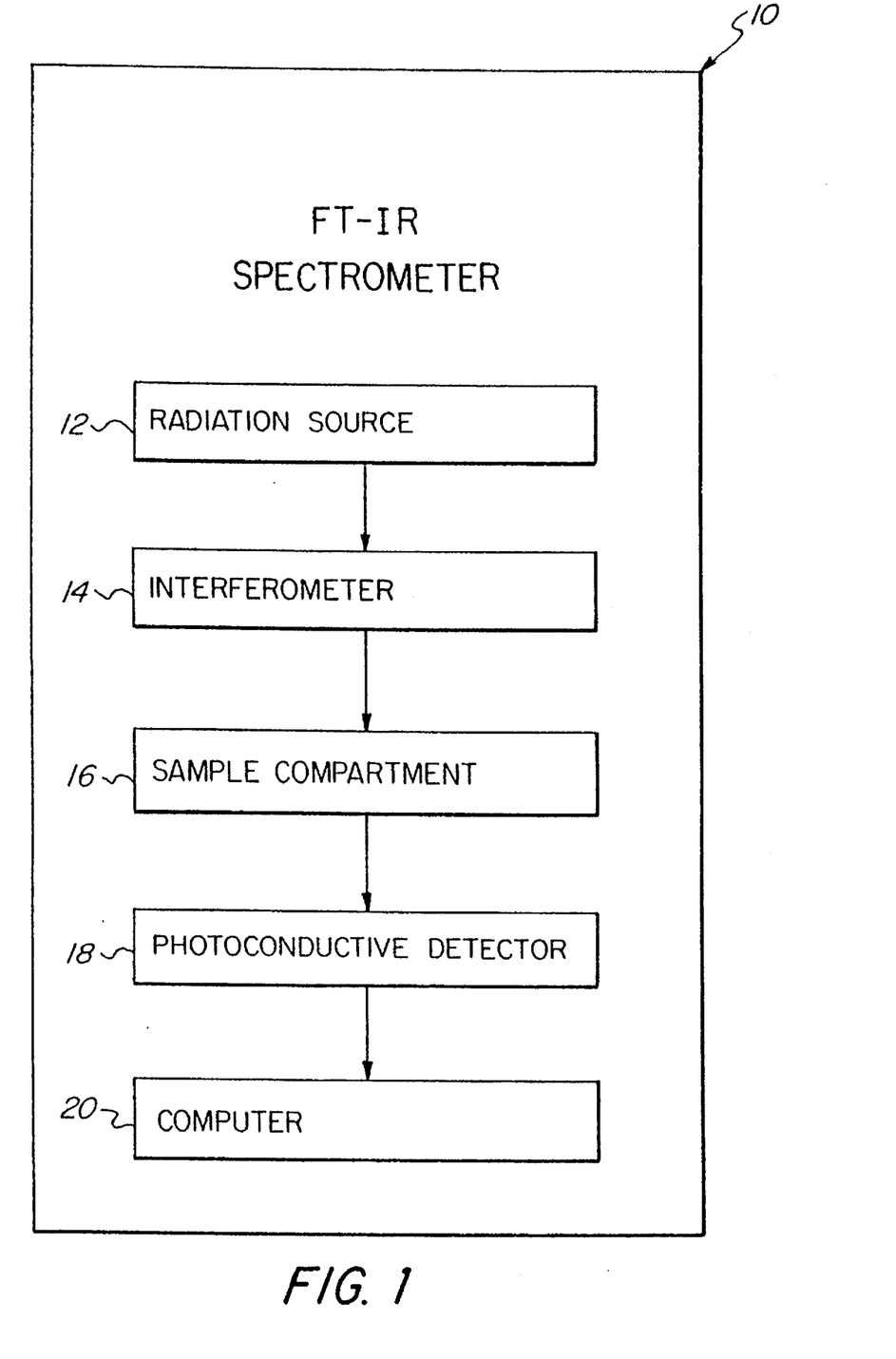
FIG. 1 is a schematic block diagram of a Fourier transform infrared (FT-IR) spectrometer incorporating an interferometer embodying the present invention.

Turning initially to FIG. 1 of the drawings, therein schematically illustrated is an FT-IR spectrometer, generally designated by the numeral 10. The spectrometer includes a radiation source 12 capable of producing a collimated beam of infrared radiation, which is directed (by suitable transfer optics, not shown) into the interferometer, generally designated by the numeral 14, by which it is amplitude modulated as a function of frequency. After passing through the sample compartment 16, the interferogram beam is caused to impinge upon a photoconductive detector 18, the output electrical signal from which is then subjected to analysis in the computer 20 to provide desired analytic data.

Figure 2:
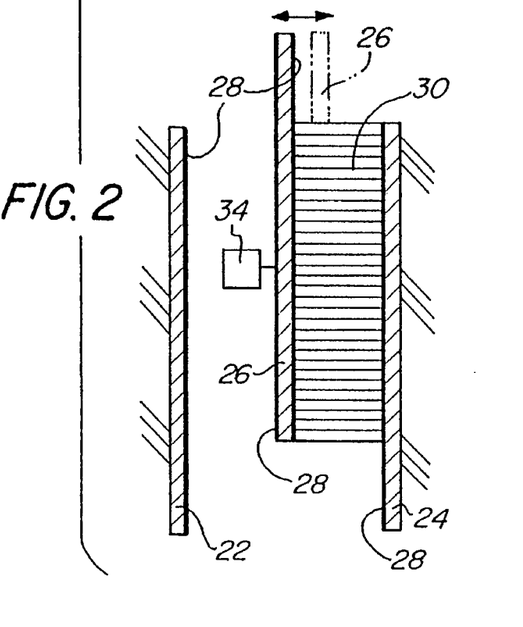
FIG. 2 is a schematic plan view of one form of a channel-defining support structure suitable for use in the interferometer of the invention, with an alternate position of an intermediate wall shown in phantom line.
Figure 3:
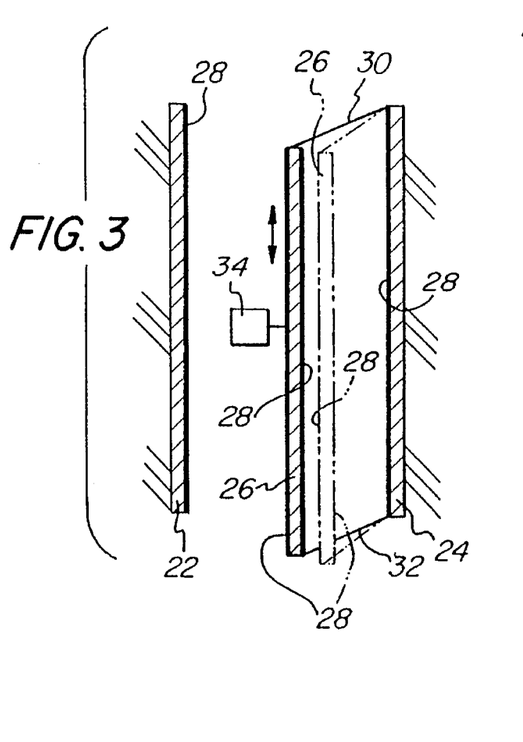
FIG. 3 is a schematic, end elevational view of the structure shown in FIG. 2.

A specific form of support structure, utilized for defining reflective paths through an interferometer embodying the invention, is illustrated in FIGS. 2 and 3. The assembly consists of two stationary outer walls 22, 24 (supported by means not specifically suggested), and a movable inner wall 26, the confronting surfaces of which walls 22, 24, 26 mount planar mirrors 28. The inner wall 26 is attached at the top and bottom to the stationary wall 24 by linking elements 30, which are of equal length and are connected at their opposite ends by flexible means; this parallelogrammic assembly serves of course to constrain the wall 26 to movement in parallel planes, and to maintain at least substantial parallelism with respect to the planes of walls 22 and 24. A drive mechanism 34 (which may be of a piezoelectric, magnetic or mechanical nature) is operatively connected to the inner wall 26 and serves to reciprocate it between alternative positions, constantly and at a controlled rate of speed.

As wall 26 is caused to oscillate vertically (in the orientation depicted), the linking elements 30, 32 constrain it to lateral movement in parallel planes, narrowing one of the channels while simultaneously widening the other, with the plane mirrors 28 in turn always being maintained substantially parallel to one another. Needless to say, the phantom line representation of FIGS. 1 and 2 show the wall 26 displaced (from the full-line, centralized position) to a position closer to the wall 24 and further from the wall 22. This will of course cause a beam directed into the channel between walls 24 and 26 (in the phantom line relationship depicted) to follow a shorter traversal path distance than a beam directed into the channel between the walls 22 and 26, which will be commensurately lengthened.

Figure 4:
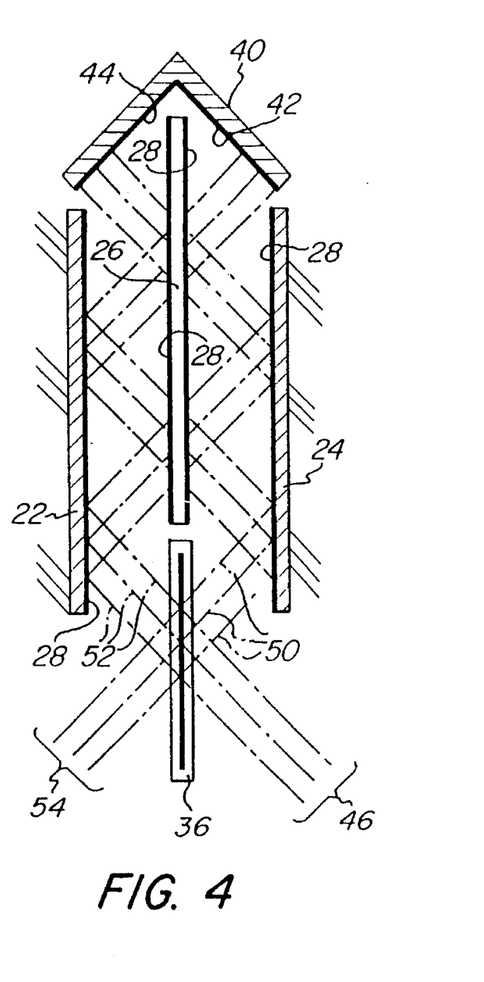
FIG. 4 is a schematic plan view of an interferometer incorporating the structure shown in FIGS. 2 and 3, including a beamsplitter and retroreflecting mirrors, in which is diagrammatically illustrated the paths of the beam components through the two reflective channels defined.

Turning now to FIG. 4 (wherein the same reference numbers are used to designate parts common to the preceding Figures), collimated electromagnetic radiation 46 is directed upon a partially reflecting beamsplitter 36, by which the input beam is divided into two separate component beams, a reflected component 50 and a transmitted component 52. Both beam components impinge upon the mirrors 28 defining the paths through their respective channels; as will be noted, the beamsplitter 36 is generally parallel to the planes of the mirrors 28, and the beams make four reflections in traversing the channels in each direction. Upon exiting the opposite ends of the channels, the components 50, 52 strike the planar reflective surfaces 42, 44 of retroreflector 40, respectively, which surfaces are oriented with strict perpendicularity to the emerging beams so as to cause the beam components to precisely retrace their original paths reversely through the channels, recombining at the beamsplitter 36 and forming exit beam 54. That beam is directed toward a focusing element (not shown), through a sample in the compartment 16 (in the embodiment depicted by FIG. 1), and finally onto a photoconductive detector 18.

Figure 5:
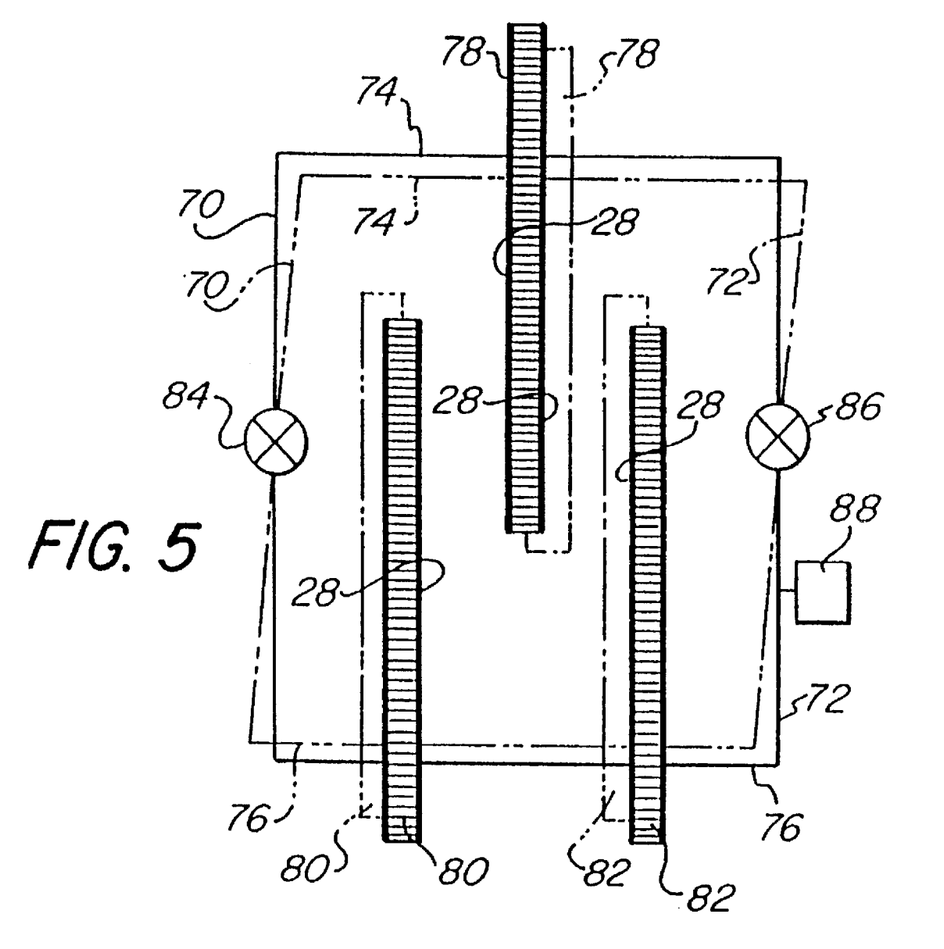
FIG. 5 is a plan view similar to that of FIG. 2, showing a balanced support structure providing interferometer walls.

FIG. 5 illustrates support structure for an interferometer embodying the invention, which is mechanically balanced about its pivot points and hence affords optimal levels of mechanical stability. The system comprises a frame of four rigid plates 70, 72, 74 and 76, flexibly joined to one another at the corners. Wall 78 is rigidly mounted on the upper plate 74, with its plane normal to that of the plate, and walls 80 and 82 are similarly mounted on the lower plate 76; end plates 70 and 72 are pivotably supported midway along their lengths at 84 and 86, and a beamsplitter (not shown) is so disposed as to project radiation from an incident beam into the two channels so defined (i.e., it will lie in a generally parallel to the planes of the mirrors 28 on the walls 78–82, and in registry therewith).

Consequently, when force is applied to plate 72, through activation of an operatively connected drive mechanism 88, a distortion of the original rectangular geometry is produced, by which the frame plates and the attached walls are brought to the parallelogrammic relationship shown in phantom line. This reconfiguration of the frame moves the confronting mirrors 28 on the walls 78 and 82 closer to one another while simultaneously increasing the distance between the mirrors 28 on the walls 78 and 80; the parallel orientation of the mirror planes will of course be maintained in all positions.

It will be appreciated that an arrangement similar to that of FIG. 5 could be used in which one of the plates 74 or 76 is fixedly mounted while the other is free to move; doing so would however tend to compromise somewhat the stability provided by the illustrated system. It will also be apparent to those skilled in the art that, in accordance with certain embodiments of the invention, alternative systems may be substituted for those described. Designs for mounts, by which relatively displaceable parallel mirrors can be kept aligned to within a few arc-seconds, have been disclosed for example by Jones, R. V. 1962 "Some Uses of Elasticity in Instrument Design" *J. Sci. Instrum.*, 39, 193–203 (note in particular the parallel spring movement illustrated on page 196); Jones, R. V. and Young, I. R. 1956 "Some Parasitic Deflexions in Parallel Spring Movements" *J. Sci. Instrum.*, 33, 11–15; Bradley, D. J. 1962 "Parallel Movement for High Finesse Interferometric Scanning" *J. Sci. Instrum.*, 39, 41–45; and Smith, S. T. et al 1987 "Design and Assessment of Monolithic High Precision Translation Mechanisms" *J. of*

*Physics* E. 20, 977–983 (note in particular the simple compound rectilinear spring arrangement illustrated on page 978).

Figure 6:
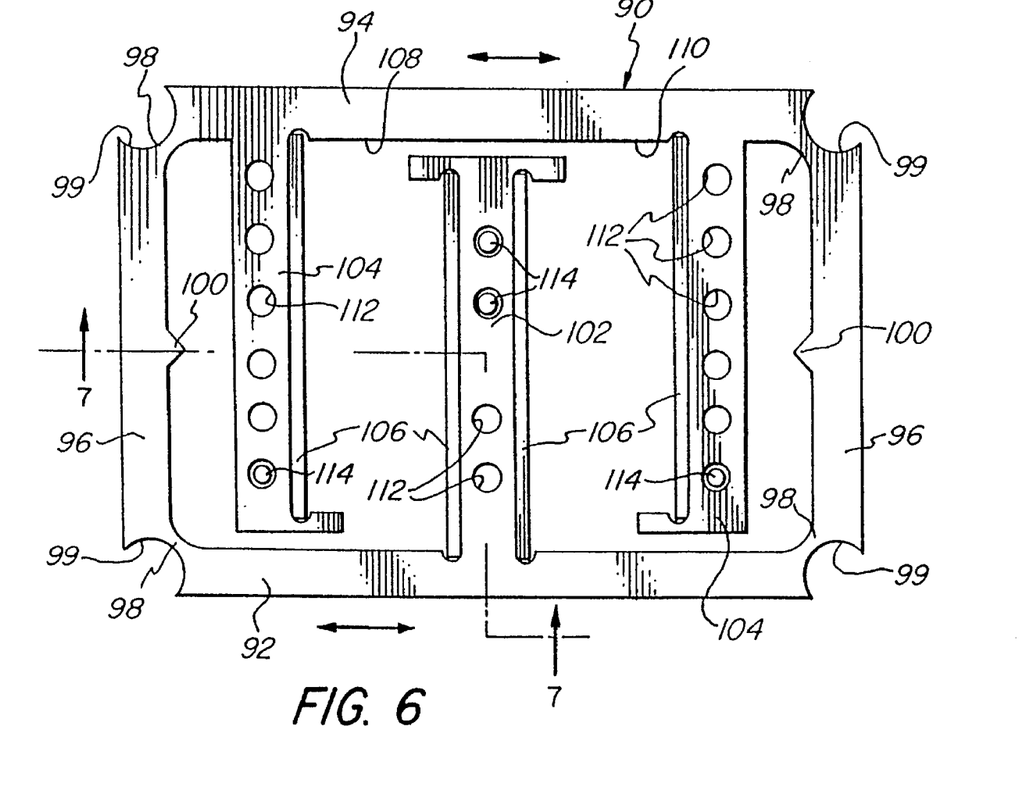
FIG. 6 is a plan view of a more specific form of support structure of the kind shown in FIG. 5.
Figure 7:
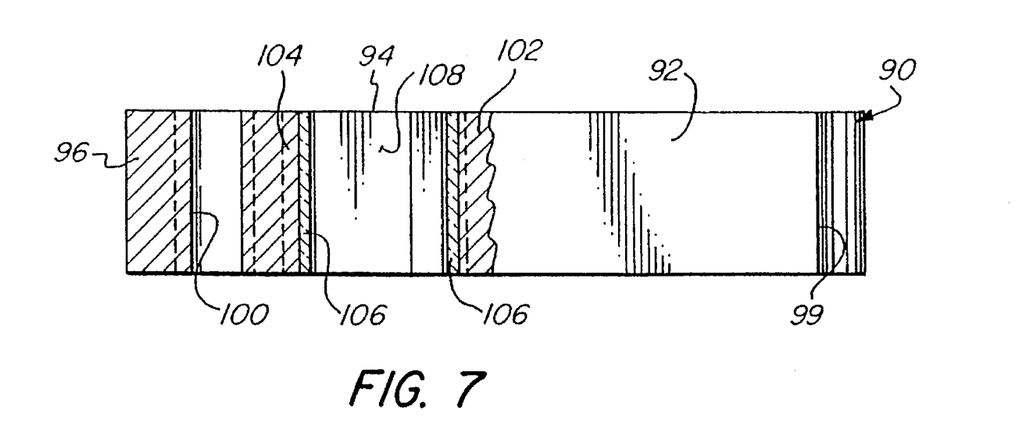
FIG. 7 is an elevational view of the structure of FIG. 6, taken in palatial section along line 7—7 thereof.

Turning now to FIGS. 6 and 7, the system shown therein is comprised essentially of a unitary support body, generally designated by the numeral 90, which may be machined or otherwise formed from a single, rectangular block of metal or the like. It consists of front and rear walls 92, 94, respectively, and end walls 96, the four walls being joined at the corners by flexible hinge elements or joints 98, formed by cutting grooves 99 of semicircular cross section, producing right cylindrical channels therealong. Pivot edges 100 project inwardly from along the internal surfaces of the end walls 96, midway along their lengths and into registry with the flexural plane of the adjacent hinge elements 98, which edges 100 serve to mount the body 90 on suitable support structure (not shown). A central interior wall 102 projects rearwardly from the front wall 92 to a point short of the rear wall 94, and two lateral walls 104 project forwardly from the rear wall 94 to points short of the front wall 92 and with equidistant spacing from the central wall 102. Plane mirrors 106 are secured against the four confronting faces of the walls 102 and 104, to define reflective channels 108 and 110 therebetween. As will be appreciated, the application of force (by means not shown) to one of the exterior walls of the body 10 will serve to produce the necessary and desirable displacement of the reflective surfaces defining the channels 108, 110, in accordance with the disclosure hereinabove provided.

The body 90, used in the assembly of FIGS. 6 and 7, is (like that of FIG. 5) advantageous in providing a structure that is mechanically balanced about pivot edges 100, which lie on an intermedial plane that demarcates two statically balanced portions of the frame. Such structure may include means by which the center of gravity can be located precisely on the axis of pivoting; removal of material from holes, such as those shown at 112 in FIG. 7, could serve that purpose (in addition to reducing the overall mass of the body).

In accordance with certain of the preferred embodiments of the invention, however, several of the holes 112 carry weighting plugs 114, which increase the mass of the outer end portions of the walls 102, 104. This serves to displace to remote positions the centers of gravity of the two portions of which the body 90 consists; i.e., the center of gravity of the portion of the structure above the intermedial axis (on which lies substantially the upper horizontal part of line 7—7), as depicted in FIG. 6, is below that axis (or plane), and the center of gravity of the lower portion of the structure is above the axis. This in turn serves to immunize the structure against distortion due to moments of rotational inertia acting at the pivot edges 100.

Figure 8:
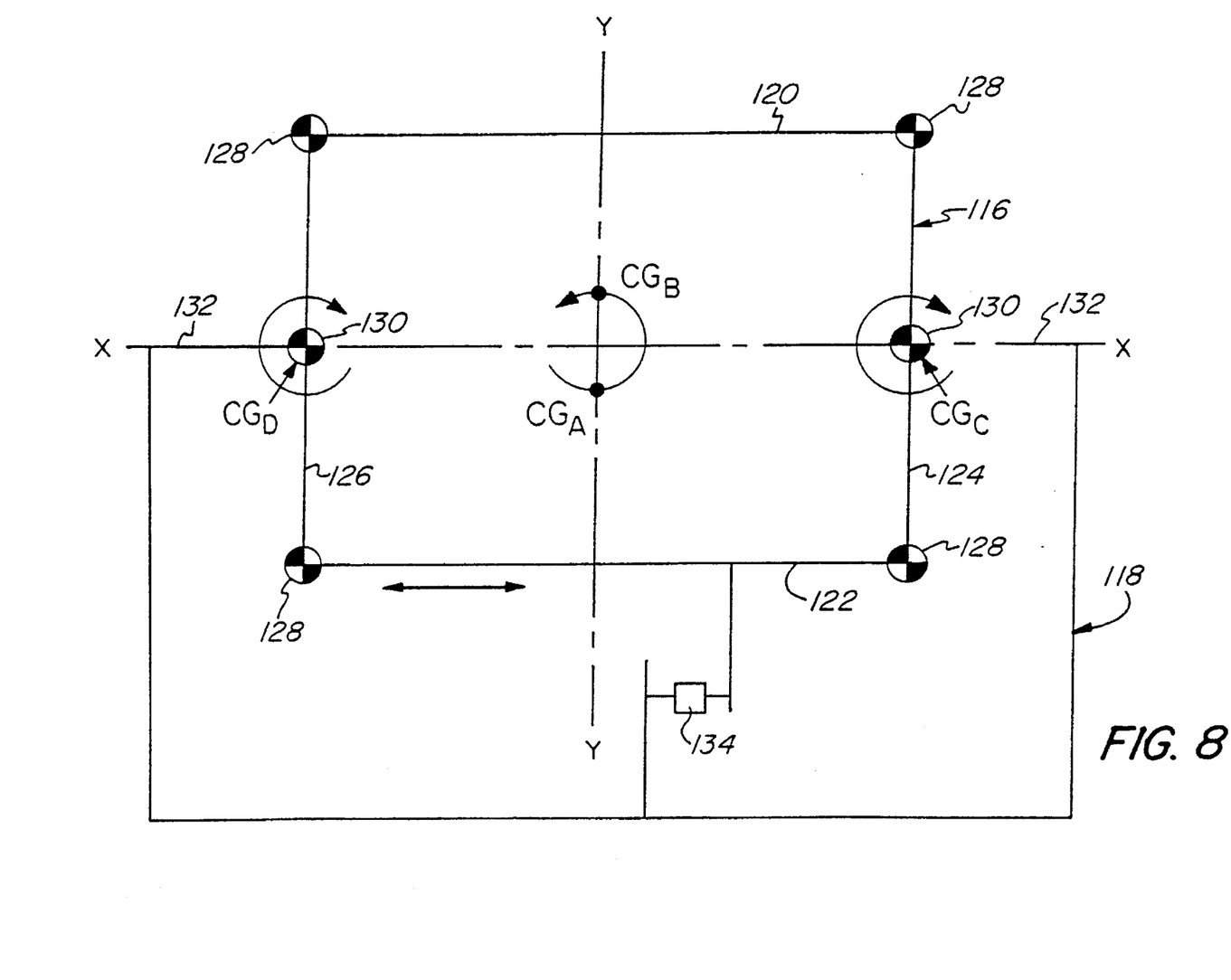
FIG. 8 is a diagrammatic representation of idealized support structure embodying the present invention, in assembly with mounting means.

The diagrammatic representation constituting FIG. 8 of the drawings shows the mass and spatial relationships of an idealized system for producing such isolation, consisting of support structure and mounting means, generally designated respectively by the numerals 116 and 118. The support structure includes opposite side members 120, 122, opposite end members 124, 126, and interposed flexible joints 128 connecting contiguous end portions of the rigid members. In this form, the two side members 120, 122 have the same mass, as do the two end members 124, 126; the side members 120, 122 are equidistantly spaced from the axis x—x through the elements 130, which thereby serves to effectively divide the structure 116 into two portions, the overall mass and configurations of which are equal.

FIG. 8 also shows that the centers of gravity, $CG_A$ and $CG_B$, respectively, of the side members 120, 122 (and hence, of the opposite structure portions defined) are disposed on an axis y—y which is perpendicular to the axis x—x and effectively divides the structure 116 into two equal lateral portions. Although not indicated by any structural feature illustrated, it will be noted that the center of gravity $CG_A$ of the upper half portion of the structure (as depicted) is spaced to the side of the intermedial axis x—x opposite to that on which the included member 120 is disposed, and that the corresponding center of gravity $CG_B$ of the lower half portion of the structure is displaced from the included member 122 to the upper side of the axis; moreover, the centers of gravity $CG_A$ and $CG_B$ are equidistantly spaced from the intermedial axis. In addition, because the end members 124, 126 are of uniform cross section along their entire length, and the pivot elements 130 are located at their mid-points, their centers of gravity $CG_C$ and $CG_D$ are disposed at those points.

As a result, the portions of the structure 116 disposed to the opposite sides of the intermedial axis x—x will be of the same mass, and will balance one another irrespective of the orientation of that axis. Because of the remote, opposite-side displacement of the centers of gravity $CG_A$ and $CG_B$, moreover, they will coact to produce a torque that is directed oppositely to any external force that would tend to produce rotation of the members 124, 126 about the pivot elements 130. If, for example, one were to set the structure in rotation about its pivot points, and thereafter arrest rotation thereat, there would be no tendency for continued flexure to occur. Thus, the moment of inertia produced by $CG_A$ and $CG_B$, in response to torques applied at points 130, can precisely balance, and thereby effectively neutralize, aberrant distortion effects and, in turn, immunize the structure against extraneous forces transmitted from the environment; i.e., in this structure the $CG_A/CG_B$ moment of inertia will be of equal magnitude, but of opposite direction, to the combined moments of inertia of the end members 124, 126 about $CG_C$ and $CG_D$. Because of the statically balanced relationship that exists between the same two portions of the structure, moreover, translational forces imparted thereto through the points 130 will be negated as well. It should be appreciated that these principles of static and dynamic balance apply alone and together, and thus enable the provision of a structure that is immunized either rotationally or translationally, or both.

The mounting structure diagrammatically illustrated in FIG. 8 includes pivot members 132, which cooperate with the pivot elements 130 of the support frame 116 to mount it in the manner described. The system additionally includes a drive unit 134, which is provided to impart controlled distortional motion to the structure 116 so as to adapt it for use in interferometric applications.

Figure 9:
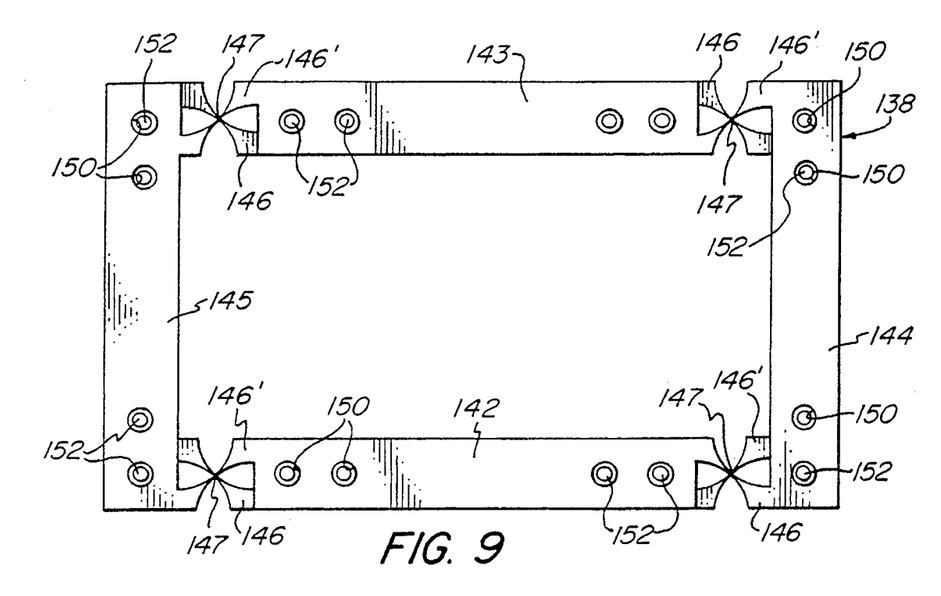
FIG. 9 is a plan view of an assembly suitable for use in providing a preferred form of support structure embodying the present invention.
Figure 10:
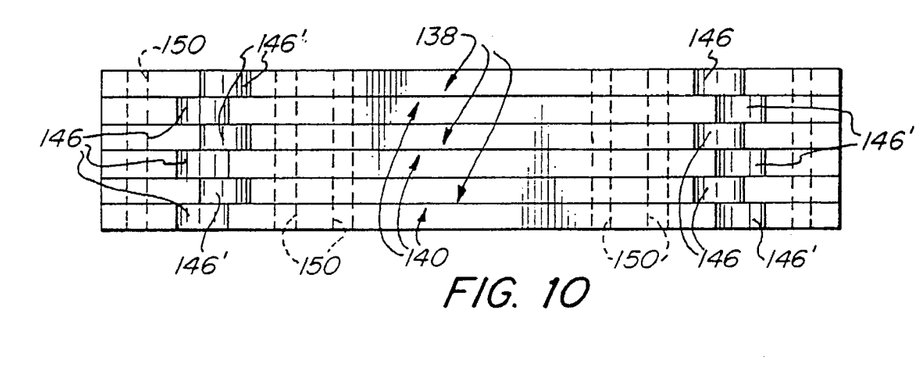
FIG. 10 is a side elevational view of the assembly of FIG. 9.
Figure 11:
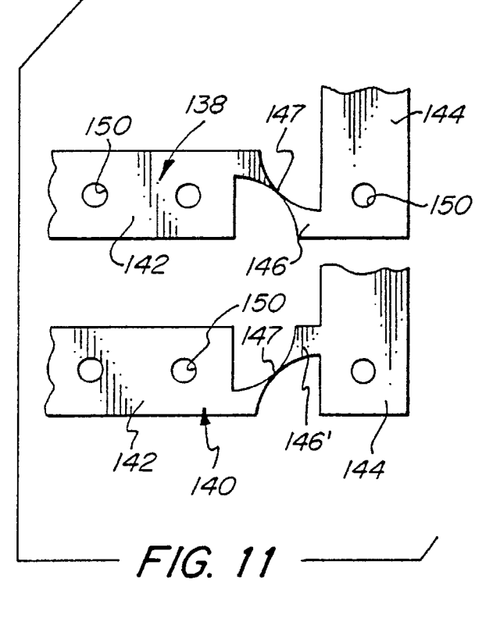
FIG. 11 is a fragmentary plan view showing two of the planar pieces from which the assembly of FIGS. 9 and 10 is constructed, drawn to a somewhat enlarged scale.

Turning finally to FIGS. 9–11 of the drawings, therein illustrated is an assembly suitable for use in providing the support structure of the invention. The assembly consists of six planar pieces of frame-like configuration, generally designated by the numerals 138 and 140, stacked in an alternating arrangement, as seen in FIG. 10. Each of the pieces 138, 140 consists of opposite side elements 142 and 143, and opposite end elements 144 and 145, the contiguous portions of which are joined by a web elements 146, 146'; the different designations 146, 146' are indicative of the opposite orientations of the 45° oblique axes on which the web elements extend. As best seen in FIG. 11, each element 146, 146' is defined by opposing concave edges, which closely approach one another at the mid-point of the element to define a flexure zone 147 thereat of very thin cross section. The elongate elements 142–145 are formed with holes 150, which register with one another in the stacked arrangement and serve to receive fasteners 152 by which the pieces 138, 140 are secured in assembly.

FIG. 9 best shows that the web elements 146, 146' cross one another in the assembly, with the flexure zones 147 thereof aligned at the intersection. The web elements thus function in the manner of a so-called "cross-spring pivot," a flexure construction that is broadly known in the art and that constrains the attached members to relative movement about a single axis; in the present assembly, the web element constrains the frame-defining members, constituted by the stacked elongate elements 142–145, to relative movement solely on the axes through the aligned flexure zones 147.

Although the double concave form of the web elements illustrated may be preferred in certain instances, it is not necessary that they have that shape in order to function in the intended manner. Elements that are uniform along their length may for example be substituted, albeit that the illustrated form of web elements provides smooth transitions from the connected elements to the pivot points, and minimizes stress concentrations that might otherwise be presented at locations of attachment. Moreover, it will be appreciated that the assembly illustrated in FIGS. 9 and 10 would be so modified as to provide suitable members for supporting reflective elements, in those instances in which the assembly is to be employed in an interferometer or a like optical instrument.

Many other modifications may of course be made to the structures and assembly described, without departure from the novel concepts of the invention. For instance, it will often be advantageous to provide means for variably adjusting the mass and mass distribution of a structure, or of a portion thereof, so as to enable most convenient repositioning of centers of gravity. Similarly, it will be appreciated that an assembly of integrally formed stacked pieces, of the character shown in FIGS. 9-11, may be employed to provide a flexible structure for virtually any purpose, and of virtually any configuration, and that the number and arrangement of such pieces employed therein can of course vary; for example, an optimal arrangement may constitute four pieces, stacked in the sequence 138, 140, 140, 138, with a spacer (i.e., a piece devoid of web elements 147) centrally interposed between the pieces 140. Materials of construction will be obvious to those skilled in the art, taking into account the purpose for which the article is intended. Finally, it should perhaps be pointed out that references herein to "extraneous" forces is intended to encompass all such forces as may introduce uncontrolled, and undesirable distortion into a structure, but will generally refer to vibration that is transmitted from an external source through a mounting system.

Thus, it can be seen that the present invention provides a novel structure for the dynamic support of reflective elements, in which a high degree of immunization against vibration and other extraneous forces is afforded, and in particular immunization against both translational and rotational effects. The structure may comprise a two-beam interferometer, and may most desirably be fabricated from a plurality of unitary planar pieces, integrally formed to provide, in assembly, contiguous rigid members and interposed flexible joints. The novel structure, interferometer, and assembly of the invention are, in addition, of relatively incomplex design and construction, and hence of relatively facile and inexpensive manufacture.

Having thus described the invention, what is claimed is:

1. Dynamic support structure, comprising a multiplicity of rigid members including a pair of opposing side members and a pair of opposing end members, said members being flexibly interconnected so as to provide a frame and to permit conjoint displacement of said side members in opposite directions along parallel axes of shifting, with said end members rotating in the same direction about pivot points, said structure comprising at least two planar pieces of similar configuration affixed in substantiality coextensive, superposed relationship and cooperatively providing at least one contiguous pair of said members consisting of a side member and an end member, and providing a flexible joint between said members of said contiguous pair, each of said planar pieces being of integrally formed, unitary construction and including first and second elongate elements having longitudinal axes and contiguous end portions, and a flexible web element joining said contiguous end portions and extending therebetween on an oblique axis to both of said longitudinal axes when said longitudinal axes are mutually perpendicular, said first elements of said two pieces together providing said side member of said contiguous pair, said second elements of said two pieces together providing said end member of said contiguous pair, and said web elements of said two pieces together providing said flexible joint therebetween, said oblique axes crossing one another and thereby causing said web elements to constrain said member of said contiguous pair to relative movement about a single axis of flexure, disposed at the intersection of said oblique axes.

2. The structure of claim 1 wherein said oblique axis is disposed at 45° to said mutually perpendicular longitudinal axes.

3. The structure of claim 1 wherein each of said web elements of said planar pieces is defined by opposing, concave edges having the same radius, and a center point on an axis perpendicular to said oblique axis, said concave edges defining, at the mid-point of said element, a zone of minimum cross section at said axis of flexure.

4. The structure of claim 1 wherein each of said planar pieces is of closed, frame-like form, and consists of four of said elongate elements interconnected by four of said web elements.

\* \* \* \* \*